Feb. 16, 1937. F. SBICCA Re. 20,273
METHOD OF MAKING SHOES
Original Filed Feb. 2, 1931 2 Sheets-Sheet 1
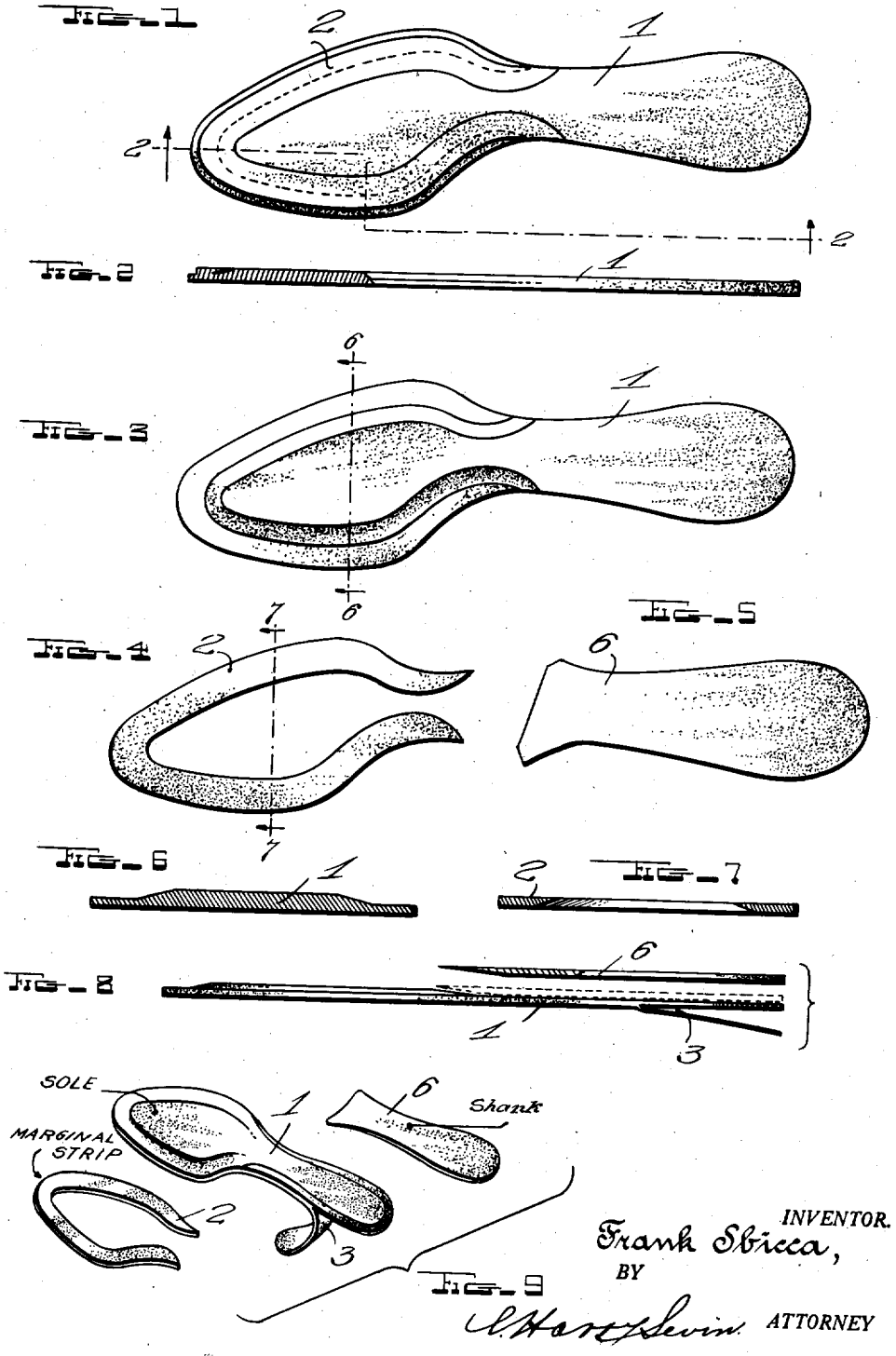
INVENTOR.
Frank Sbicca,
BY
A. Harry Levin ATTORNEY Feb. 16, 1937. F. SBICCA Re. 20,273
METHOD OF MAKING SHOES
Original Filed Feb. 2, 1931 2 Sheets-Sheet 2
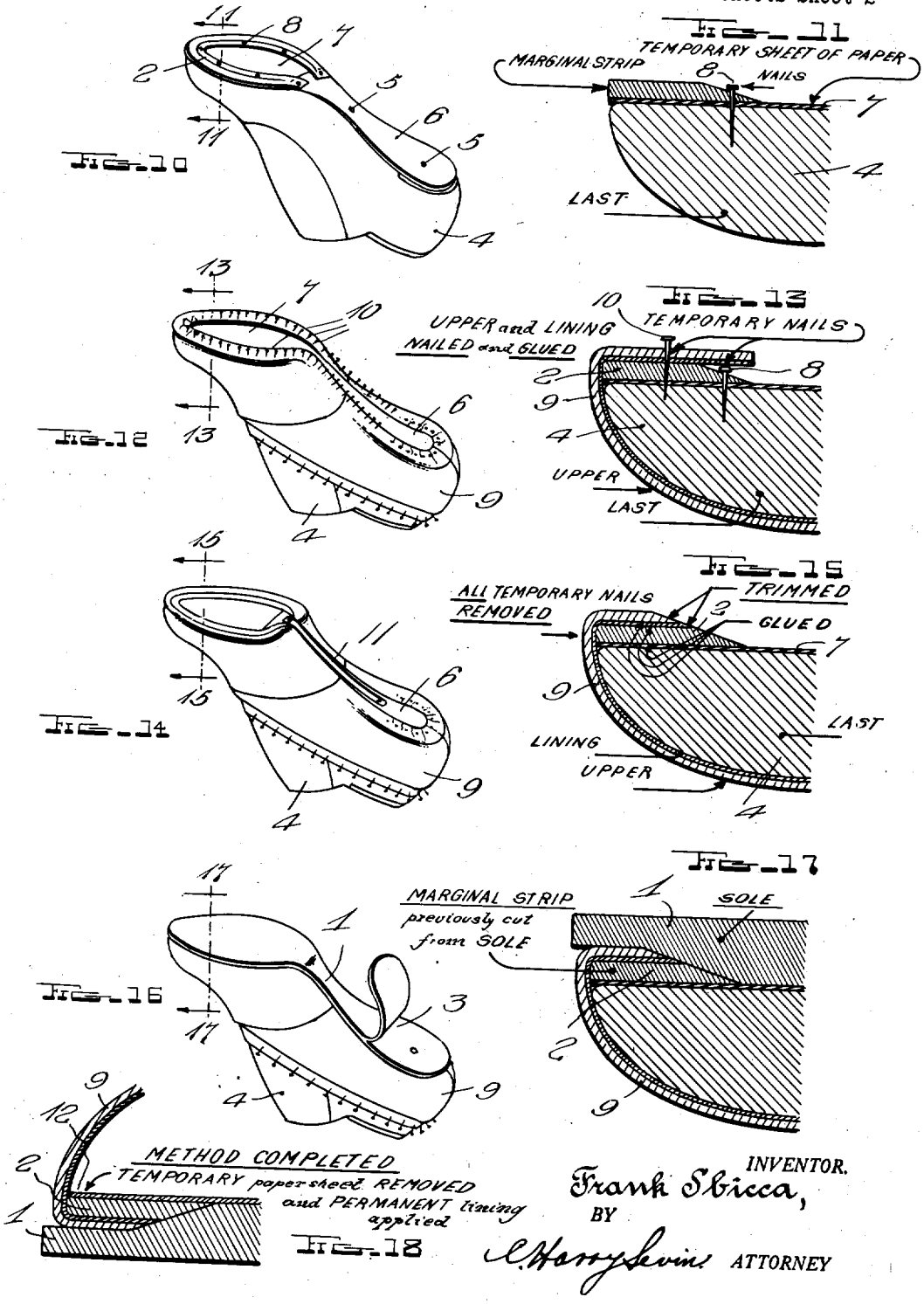
INVENTOR.
Frank Sbicca,
BY
C. Harry Levine ATTORNEY Reissued Feb. 16, 1937

Re. 20,273

UNITED STATES PATENT OFFICE 20,273

METHOD OF MAKING SHOES

Frank Sbicca, Philadelphia, Pa., assignor to Sbicca-Method Shoes Incorporated, Philadelphia, Pa., a corporation of Delaware Original No. 1,838,708, dated December 29, 1931, Serial No. 512,965, February 2, 1931. Application for reissue May 17, 1933, Serial No. 671,557

6 Claims. (Cl. 12—142)

My invention relates to new and useful improvements in shoes and the method of making the same, the primary object of the invention being to provide an improved method of making women's shoes so that the shoe when completed will give the effect of what is known as a turned shoe, but in effect is made similar to a shoe produced by what is known as the cemented shoe process, yet differs from both of them and overcoming the many objectionable features of both of the aforesaid shoes.

A further object of the invention resides in providing a cemented shoe and a method of making the same wherein but a single sole is used, thus eliminating the objectionable features of an inner sole, such as is used in the "McKay" process, the cemented shoe process and similar processes.

A further object of the invention resides in the provision of a process for making shoes which will produce rigidity and strength at the portions thereof requiring the same but which will eliminate unnecessary thicknesses at the portions of the shoe where thinness and lightness are most desirable.

A further object of the invention resides in providing a shoe which is light in weight, durable under the heaviest wear and one which will avoid squeaks.

Still another object of the invention resides in using a single sole from which is cut a marginal sole rand applicable to the last and to which the upper is secured prior to the application of the sole proper.

With these and numerous other objects in view, my invention consists in the novel features of construction, combination and arrangement of parts as will be hereinafter referred to and more particularly pointed out in the specification and claims.

In the accompanying drawings, forming a part of this application:

Fig. 1 is a plan view of a sole with the first steps in my process applied thereto, that is the channelling and preliminary edge-randing process;

Fig. 2 is an edge elevation partly in section thereof, as seen on the line 2—2 of Fig. 1;

Fig. 3 is a plan view of the sole with the marginal rand removed therefrom;

Fig. 4 is a plan view of the marginal rand;

Fig. 5 is a plan view of the shank member which is utilized on the last along with the marginal rand;

Fig. 6 is a transverse section as seen on the line 6—6 of Fig. 3;

Fig. 7 is a similar view as seen on the line 7—7 of Fig. 4;

Fig. 8 is an edge elevation partly in section of the sole with the marginal rand removed, the heel portion split and showing relation with the shank member adapted to be applied thereto in the process;

Fig. 9 is a perspective view of the elements of the sole separated, one from the other, and which are used in the process of manufacturing the shoe under my method;

Fig. 10 is a perspective view showing the marginal rand and shank member applied to a last;

Fig. 11 is a transverse section therethrough as seen on the line 11—11 of Fig. 10;

Fig. 12 is a perspective view showing the lasting of the upper in its first step of temporarily nailing the upper to the last;

Fig. 13 is a transverse section therethrough as seen on the line 13—13 of Fig. 12;

Fig. 14 is a perspective view similar to Fig. 12, showing the nails removed, which is the next step in the process;

Fig. 15 is a transverse section as seen on the line 15—15 of Fig. 14;

Fig. 16 is a perspective view showing one of the final steps in the lasting of the shoe, that is, the application of the sole to the upper on the last prior to the application of a heel thereto;

Fig. 17 is a transverse section as seen on the line 17—17 of Fig. 16; and,

Fig. 18 is a transverse section through the toe portion of the shoe completed in accordance with my improved method.

In describing the invention, I shall refer to the drawings illustrating a simple embodiment of my invention, in which similar reference characters designate corresponding parts throughout the several views and in which the numeral 1 designates a sole to which is applied the first steps in my improved method which consist in removing a narrow rand from the extreme edge of the upper surface of the ball portion and in channelling the ball portion thereof to substantially the same thickness to form a marginal strip or rand designated by the numeral 2, the channelling being accomplished with the usual Goodyear Universal Channelling Machine utilizing knives known under the numbers 6U and 922-L respectively, well known to the trade. The next operation involves the removal of a second and wider rand 2 from the sole which is accomplished by using what is known as the Apex Feather-Edge Shank Reducing Machine, Model A, with knife S, well known to the trade. In Fig. 4, I have disclosed the marginal rand removed from the sole 1 and in Fig. 3, I have disclosed the sole after said rands 2 have been removed therefrom.

The sole is then smoothed and a heel portion thereof split as shown at 3 in the drawings, this being accomplished in the usual or any preferred manner. The edges of the sole throughout its length are then feathered in the usual manner. The process now leads to the application of the elements to the last.

The last in the drawings is designated by the numeral 4 and secured to this last by temporary tacking as shown at 5 is a shank member 6. Applied to the ball portion of the last 4 is a sheet of paper or the like 7 which is utilized to cover that portion of the last to prevent glue or cement from adhering to said last. Applied to the ball portion of the last over the paper 7 is the marginal rand 2, this application being a temporary one through the medium of the tacks or nails 8, as clearly shown in Figs. 10 and 11 of the drawings. As shown in Fig. 10, the marginal rand 2 is suitably connected with the shank member 6 substantially at the ball line of the shoe, so that these parts are complementary to constitute a unitary insole portion thereof which is complementary to the central raised section in the ball portion of the sole 1.

After the inner sole has been applied temporarily to the last, the upper 9 is lasted by securing its lasting allowance to the inner sole in the usual or any preferred manner, preferably by cementing it in the usual way to the marginal rand 2 and to the shank member 6, and temporarily holding it in position by means of the temporary nails or tacks 10, as clearly shown in Figs. 12 and 13 of the drawings, until the cement is dry. The lasted upper is thus allowed to remain over night, or as long as may be necessary, whereupon the temporary tacks 10 are removed. The shoe in this step of the process is disclosed in Figs. 14 and 15. A metal shank member 11 of the usual formation and as is usually applied to use in shoes of this character is then applied to the shank member 6. The shoe is then ready to have the sole 1 applied, which is accomplished as shown in Figs. 16 and 17, with the central raised section of the sole fitting within the recess in the inner sole, said sole being secured by cementing, stitching, or nailing, as may be desired, the cementing method being preferable.

As usual, the upper includes a lining 14, and after the heel has been applied in the usual manner, (not shown) the paper 7 may be removed and a sock lining may be applied to the sole on the inside of the shoe in the usual manner, such lining in Fig. 18 being designated by the numeral 12.

It will thus be seen that a shoe is constructed which is composed of but a single sole but which will give the desired effect of two soles, so far as rigidity and strength is concerned and yet have the lightness of a single soled shoe as well as the many desirable features of the turned shoe.

In the preferable embodiment wherein cement is employed in affixing the sole, it will also be apparent that the sole is permanently attached to the lasted upper without delasting the shoe.

From the foregoing description of the method of constructing my improved shoe, the steps in the process of construction and the structure of the shoe in general will be readily understood and it will be seen that I have provided a comparatively simple, inexpensive and efficient means for carrying out the objects of the invention.

While I have particularly described the elements and steps best adapted to perform the functions set forth, it is obvious that various changes in form, proportion and in the minor details of construction may be resorted to without departing from the spirit or sacrificing any of the principles of the invention.

Having thus described the invention, what is claimed is:

1. The method of constructing a cemented shoe consisting in providing a sole of the desired final sole thickness in the finished shoe, removing from the edges of the upper surface of the ball section and adjacent portions of the shank section of the sole a rand of less thickness than the sole and reducing the thickness of the shank and heel portions of the sole, by removal of material from the upper surface thereof, to the thickness of the marginal portions of the ball section thereof, applying a shank piece and said rand to a last and securing the terminals of the rand in over-lapping relation to the forward end of the shank, lasting an upper and permanently securing the same to the rand and the edges of the shank, and permanently attaching the sole to the upper, the rand, and the shank without delasting the shoe.

2. The method of constructing a cemented shoe consisting in providing a sole of the desired final sole thickness in the finished shoe, removing from the edges of the upper surface of the ball section and adjacent portions of the shank section of the sole a rand of less thickness than the sole and reducing the thickness of the shank and heel portions of the sole, by removal of material from the upper surface thereof, to the thickness of the marginal portions of the ball section thereof, lasting an upper upon a last to which said rand and a shank piece to which the rand is secured have been applied, and permanently securing the upper to the rand and the edges of the shank piece, and permanently attaching the sole to the upper, the rand, and the shank without delasting the shoe.

3. The method of constructing a shoe which comprises providing a sole of the desired final sole thickness in the finished shoe, removing from the edges of the upper surface of the ball section and adjacent portions of the shank section of the sole a rand of less thickness than the sole and reducing the thickness of the shank and heel portions of the sole also by removal of material from the upper surface thereof, temporarily securing the rand and a shank piece in connected relation to the bottom of a last, lasting an upper thereon by permanently securing the lasting allowance of the upper to the rand and the shank piece, and permanently attaching the sole to the lasted upper by cement without delasting the shoe.

4. The method of constructing a cemented shoe which comprises providing a sole of the desired final sole thickness in the finished shoe, removing from the edges of the upper surface of the ball section and adjacent portions of the shank section of the sole a rand of less thickness than the sole, and reducing the thickness of the shank and heel portions of the sole also by removal of material from the upper surface thereof to the thickness of the marginal portion of the ball section thereof, temporarily securing the rand and a shank piece in connected relation to the bottom of a last, lasting an upper thereon by securing the lasting allowance of the upper to the rand and the shank piece with cement, and permanently attaching the sole to the lasted upper by cement without delasting the shoe.

5. The method of constructing a shoe which comprises providing a sole of predetermined size and of the desired final sole thickness in the finished shoe, removing material from the upper surface of said sole to reduce the thickness of the heel and shank portions and to reduce the peripheral edge of the ball section to substantially the same thickness, using the material removed from the peripheral edge of the forepart to form a rand mating on its inner edge with the remaining raised central portion of the outsole and of a size smaller in peripheral outline than the outsole, temporarily securing said rand and a shank piece in connected relation to the bottom of a last, lasting an upper thereon by securing the lasting allowance of the upper to the rand and the shank piece, and permanently attaching the sole to the lasted upper, without delasting the shoe.

6. The method of constructing a shoe which comprises providing a sole of predetermined size and of the desired final sole thickness in the finished shoe, removing a small rand of less thickness than the sole from the extreme edge of the upper surface of the ball section, removing from the edges of the upper surface of the ball section and adjacent portions of the shank section a second and wider rand of substantially the same thickness as the first rand, reducing the thickness of the shank and heel portions of the sole also by removal of material from the upper surface thereof to substantially the thickness of the marginal portion of the ball section thereof, temporarily securing the said wider rand and a shank piece to the bottom of a last, lasting an upper thereon by securing the lasting allowance of the upper to the said wider rand and the shank piece, and permanently attaching the sole to the lasted upper by means of cement without delasting the shoe.

FRANK SBICCA.